United States Patent
Yan

(10) Patent No.: US 10,850,986 B2
(45) Date of Patent: Dec. 1, 2020

(54) FLUORINATED GRAPHENE AND PREPARATION METHOD THEREOF

(71) Applicant: Linde Zhang, Shenzhen (CN)

(72) Inventor: Jin Yan, Shenzhen (CN)

(73) Assignee: Linde Zhang, Shenzhen (CN)

(*) Notice: Subject to any disclaimer, the term of this patent is extended or adjusted under 35 U.S.C. 154(b) by 114 days.

(21) Appl. No.: 16/086,318

(22) PCT Filed: Jun. 6, 2017

(86) PCT No.: PCT/CN2017/087296
§ 371 (c)(1),
(2) Date: Sep. 19, 2018

(87) PCT Pub. No.: WO2017/174043
PCT Pub. Date: Oct. 12, 2017

(65) Prior Publication Data
US 2019/0100436 A1 Apr. 4, 2019

(30) Foreign Application Priority Data

Apr. 7, 2016 (CN) .......................... 2016 1 0214775

(51) Int. Cl.
*C01B 32/194* (2017.01)
(52) U.S. Cl.
CPC ........ *C01B 32/194* (2017.08); *C01B 2204/02* (2013.01); *C01P 2002/50* (2013.01); *C01P 2004/03* (2013.01)
(58) Field of Classification Search
CPC ... C01B 32/04; C01B 32/194; C01B 2204/02; C01P 2004/03; C01P 2002/50
See application file for complete search history.

(56) References Cited

U.S. PATENT DOCUMENTS

2011/0303121 A1\* 12/2011 Geim .................... C01B 32/194
106/287.28

FOREIGN PATENT DOCUMENTS

CN 103420352 A 12/2013
CN 104724700 A \* 6/2015
(Continued)

OTHER PUBLICATIONS

Zhao, Fu-Gang, et al. "Fluorinated graphene: facile solution preparation and tailorable properties by fluorine-content tuning." Journal of Materials Chemistry A 2.23 (2014): 8782-8789.\*
(Continued)

*Primary Examiner* — Richard M Rump
(74) *Attorney, Agent, or Firm* — Bayramoglu Law Offices LLC

(57) ABSTRACT

The present invention relates to a preparation method of fluorinated graphene. The method for preparing fluorinated graphene, including the following steps: S1), under the protection of inert gas, the graphene undergoes a fluorination reaction with a first fluorinating agent, the reaction temperature is 150-550° C., the reaction time is 2-20 h, and a fluorinated graphene crude product is obtained. The graphene is graphene powder, or a graphene film; the first fluorinating agent includes fluorine gas; S2), under the protection of inert gas, the fluorinated graphene crude product undergoes a fluorination reaction with a second fluorinating agent, the reaction temperature is 150-400° C., the reaction time is 2-10 h, and a fluorinated graphene is obtained. The second fluorinating agent is gas-phase fluoride. By using the method, fluorinated graphene having a high fluorine content can be prepared, the fluorine content is close to the theoretical level, and the defect density is low.

18 Claims, 1 Drawing Sheet

(56) References Cited

FOREIGN PATENT DOCUMENTS

| CN | 104724700 A | | 6/2015 |
|---|---|---|---|
| CN | 105271199 A | | 1/2016 |
| CN | 105621399 A | * | 6/2016 |
| CN | 105883745 A | | 8/2016 |
| CN | 106421804 A | * | 2/2017 |

OTHER PUBLICATIONS

English machine translation of CN105271199 (2015).*
Kwon, S. et al., "Enhanced Nanoscale Friction on Fluorinated Graphene", NANO Letters, No. 12, Jun. 21, 2012, pp. 6043-6048.

* cited by examiner

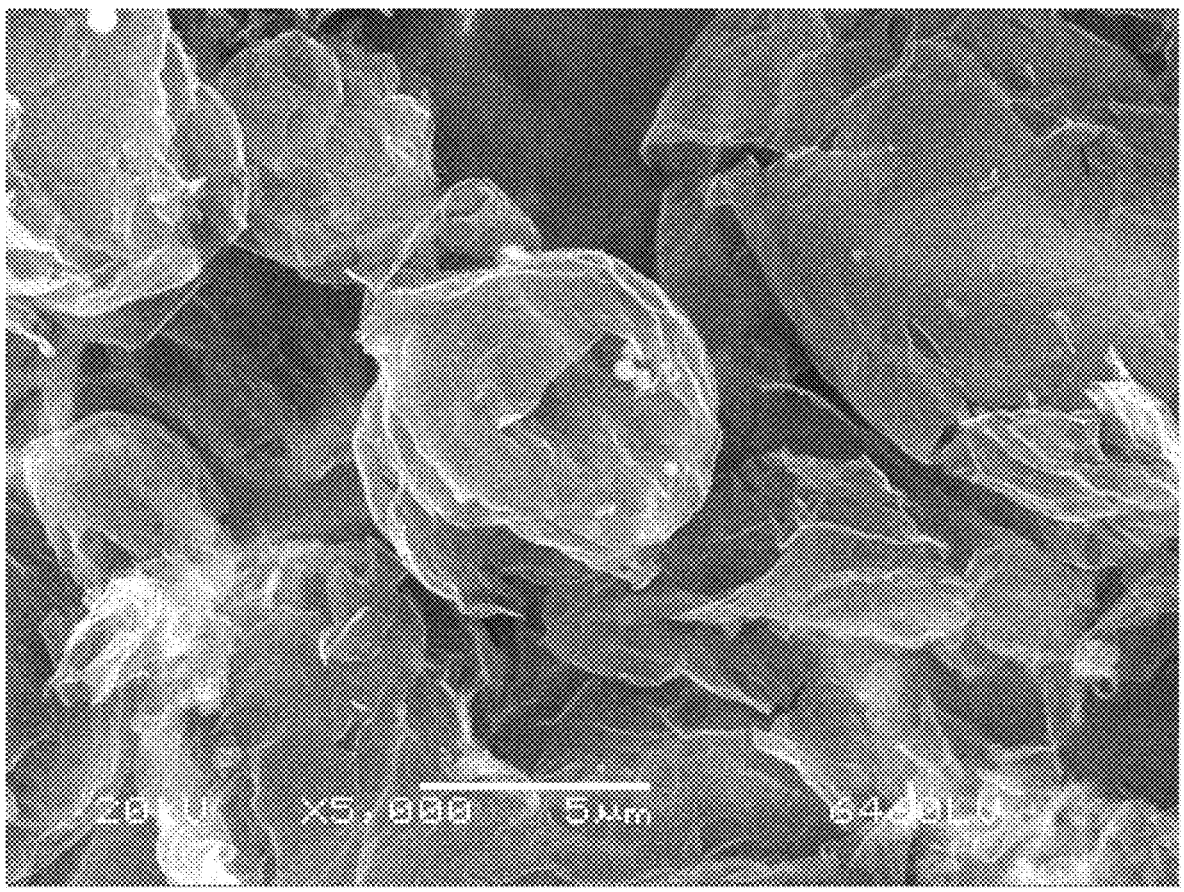

FLUORINATED GRAPHENE AND PREPARATION METHOD THEREOF

CROSS REFERENCE TO RELATED APPLICATIONS

This application is the national phase entry of International Application No. PCT/CN2017/087296, filed on Jun. 6, 2017, which is based upon and claims priority to Chinese Patent Application No. 201610214775.8, filed on Apr. 7, 2016, the entire contents of which are incorporated herein by reference.

TECHNICAL FIELD

The present invention relates to the technical field of novel materials, particularly to a fluorinated graphene, and to a preparation method of fluorinated graphene.

BACKGROUND

Fluorinated graphene is a novel material with unique properties and its structure is similar to that of graphene. Fluorinated graphene exhibits excellent insulator or semiconductor properties, and band gap thereof can be also controlled by controlling the size of fluorinated graphene sheets. Meanwhile, similar to the two-dimensional isotactic polytetrafluoroethylene, the fluorinated graphene has a very low surface energy by introducing the modification of fluorine, so that the super-oleophobic property and super-hydrophobic property can be realized very easily, thereby fluorinated graphene has broad application prospects in the fields of surface treatment, lubrication, and other similar fields.

The ideal fluorinated graphene should have a fluorine content of about 61% or higher, and should not have any other heteroatoms except for fluorine and carbon. In the prior art, the introduction of a fluorine atom and the formation of a two-dimensional structure are two core steps in the preparation of fluorinated graphene. Thus, two different process routes are formed. The first route is as follows. First, the graphite raw material is fluorinated to form a fluorinated graphite, and then the fluorinated graphite is exfoliated in a solvent to form a fluorinated graphene. The second route is as follows. The graphene is firstly formed, then the subsequent fluorination is performed to obtain a fluorinated graphene. However, the fluorinated graphene prepared by the prior art has a low fluorine content.

Therefore, how to develop a fluorinated graphene preparation technology capable of increasing the fluorine content in the graphene fluoride is an urgent technical problem to be solved by those skilled in the art.

SUMMARY

The technical problem to be solved by the present invention is to overcome the defects of the prior art and provide a method for preparing fluorinated graphene. The fluorinated graphene prepared by the method has a high fluorine content.

The present invention provides a method for preparing fluorinated graphene, including the following steps:

S1), under the protection of inert gas, the graphene undergoes a fluorination reaction with a first fluorinating agent, the reaction temperature is 150-550° C., the reaction time is 2-20 h, and a fluorinated graphene crude product is obtained; the graphene is graphene powder, or a graphene film; the first fluorinating agent includes fluorine gas;

S2), under the protection of inert gas, the fluorinated graphene crude product undergoes a fluorination reaction with a second fluorinating agent, the reaction temperature is 150-400° C., the reaction time is 2-10 h, and a fluorinated graphene is obtained; the second fluorinating agent is gas-phase fluoride;

wherein, step S1) is specifically:

under the protection of inert gas, introducing mixed gas of fluorine gas and inert gas into the surface of the graphene material continuously to perform a fluorination reaction; a volume ratio of the fluorine gas to the mixed gas is (1-30):100.

The step S2 is specifically: under the protection of inert gas, introducing mixed gas of gas-phase fluoride and inert gas to the surface of the fluorinated graphene crude product to perform a fluorination reaction; a volume ratio of the gas phase fluoride to the mixed gas is (20-80):100.

The gas-phase fluoride is one or mere selected from the group consisting of phosphorus trifluoride, bromine trifluoride, iodine trifluoride, sulfur tetrafluoride, anhydrous hydrogen fluoride, phosphorus trichloride, boron trifluoride, nitrogen trifluoride, sulfuryl fluoride-trimethylamine, sulfuryl fluoride-dimethylamine, sulfuryl fluoride-monomethylamine, sulfuryl fluoride-ammonia, sulfuryl fluoride, thionyl fluoride-trimethylamine, thionyl fluoride-dimethylamine, thionyl fluoride-monomethylamine, thionyl fluoride-ammonia, thionyl fluoride, and antimony pentafluoride.

Further, before step S1, the method further includes:

S0), heating the graphene material at a temperature of 200-300° C. for 2-4 h under an inert gas atmosphere.

Further, after step S2, the method further includes:

performing water-washing, alcohol-washing and drying on the fluorinated graphene sequentially.

Wherein, in the step S1, the first fluorinating agent further includes fluorination catalyst gas.

The fluorination catalyst gas includes one or more selected from the group consisting of phosphorus trifluoride, bromine trifluoride, iodine trifluoride, sulfur tetrafluoride, anhydrous hydrogen fluoride, phosphorus trichloride, boron trifluoride, nitrogen trifluoride, sulfuryl fluoride-trimethylamine, sulfuryl fluoride-dimethylamine, sulfuryl fluoride-monomethylamine, sulfuryl fluoride-ammonia, sulfuryl fluoride, thionyl fluoride-trimethylamine, thionyl fluoride-dimethylamine, thionyl fluoride-monomethylamine, thionyl fluoride-ammonia, thionyl fluoride, and antimony pentafluoride; and a volume ratio of the fluorination catalyst gas to a first fluorination agent gas is (20-80):100.

Further, in the step S1, the reaction temperature is 150-400° C.

Also, the present invention provides a fluorinated graphene having a fluorine content of 50%-80%.

Further, the fluorinated graphene sheets are intact without holes and defects.

The present invention provides a method for preparing fluorinated graphene. Firstly, graphene is subjected to a fluorination reaction with a first fluorinating agent under the protection of inert gas, the reaction temperature is controlled to be 150-550° C., and the reaction time is controlled to be 2-20 h, a fluorinated graphene crude product is obtained. The above graphene is graphene powder or a graphene film, and the first fluorinating agent includes fluorine gas. In this step, the protection of the inert gas can avoid the introduction of impurities. A fluorination reaction is performed between the fluorine gas in the first fluorinating agent and the carbon-hydrogen bond existing at the boundary and defects of the graphene, and the preliminary fluorination reaction of the graphene is completed. Then, the fluorinated graphene crude product is fluorinated with a second fluorinating agent, the reaction temperature is controlled to be 150-400° C., the reaction time is 2-10 h, and the fluorinated graphene is obtained. The second fluorinating agent is a gas-phase fluoride. The gas-phase fluoride has high fluorination activity, can effectively fluorinate the heteroatoms, defects and unfluorinated sites on the graphene, thereby further increasing the fluorine content of the graphene and reducing the heteroatom content. It can be seen that, by using the method provided by the present invention, fluorinated graphene having a high fluorine content can be prepared, the fluorine content is close to the theoretical level, and the fluorinated graphene sheets are intact without holes and defects. In addition, the method provided by the present invention has the characteristics of simple, smooth process and easy operation, and provides a good foundation for the application of fluorinated graphene in the fields of surface treatment, lubrication, and other similar fields.

BRIEF DESCRIPTION OF THE DRAWINGS

In order to more clearly illustrate the embodiments of the present invention or the technical solutions in the prior art, the drawings used in the embodiments or the description of the prior art will be briefly described below.

FIG. 1 is a SEM test photograph of a sample in Embodiment 11 of the present invention.

DETAILED DESCRIPTION OF THE EMBODIMENTS

The present invention discloses a preparation method of fluorinated graphene, which can be realized by those skilled in the art through referring to the contents of the present invention and improving the process parameters appropriately. It should be understood that all such alternatives and modifications are obvious to those skilled in the art and are considered to be included in the present invention. The methods and the applications of the present invention have been described by the preferred embodiments, and it is apparent that those skilled in the art can make alterations or appropriate modifications and combinations of the methods and applications described herein without departing from the content, spirit and scope of the present invention to implement and apply the techniques of the present invention.

The present invention provides a method for preparing fluorinated graphene, the method includes the following steps:

S1), under the protection of inert gas, the graphene undergoes a fluorination reaction with a first fluorinating agent, the reaction temperature is 150-550° C., the reaction time is 2-20 h, and a fluorinated graphene crude product is obtained; the graphene is graphene powder, or a graphene film; the first fluorinating agent includes fluorine gas;

S2), under the protection of inert gas, the fluorinated graphene crude product undergoes a fluorination reaction with a second fluorinating agent, the reaction temperature is 150-400° C., the reaction time is 2-10 h, and a fluorinated graphene is obtained; the second fluorinating agent is gas-phase fluoride.

The present invention provides a method for preparing fluorinated graphene. Firstly, a graphene is subjected to a fluorination reaction with a first fluorinating agent under the protection of inert gas, the reaction temperature is controlled to be 150-550° C., and the reaction time is controlled to be 2-20 h, a fluorinated graphene crude product is obtained. The above graphene is graphene powder or a graphene film, and the first fluorinating agent includes fluorine gas. In this step, the protection of the inert gas can avoid the introduction of impurities. A fluorination reaction is performed between the fluorine gas in the first fluorinating agent and the carbon-hydrogen bond existing at the boundary and defects of the graphene, and the preliminary fluorination reaction of the graphene is completed. Then, the fluorinated graphene crude product is fluorinated with a second fluorinating agent, the reaction temperature is controlled to be 150-400° C., the reaction time is 2-10 h, and the fluorinated graphene is obtained; the second fluorinating agent is gas-phase fluoride. The gas-phase fluoride has high fluorination activity, can effectively fluorinate the heteroatoms, defects and unfluorinated sites on the graphene, thereby further increasing the fluorine content of the graphene and reducing the heteroatom content. It can be seen that, by using the method provided by the present invention, fluorinated graphene having a high fluorine content can be prepared, the fluorine content is close to the theoretical level, and the fluorinated graphene sheets are intact without holes and defects. In addition, the method provided by the present invention has the characteristics of simple, smooth process and easy operation, and provides a good foundation for the application of fluorinated graphene in the fields of surface treatment, lubrication, and other similar fields.

Step S1) is a preliminary fluorination reaction of graphene. In this step, graphene is graphene powder or a graphene film. For graphene powder, the powder can be placed on an alloy ceramic boat such as Monel or Hastelloy which is resistant to fluorine and high temperature corrosion; or a fluidized bed-like structure can be formed, allowing the fluorine gas to flow sufficiently through the powder in the form of reflow heating without the need of a support, thereby avoiding the limitations on the container. For graphene films, the film can be transferred to a fluorine-resistant substrate; or a film can be formed directly on such a substrate. Such substrates are typically the ones such as high temperature glass substrates, ceramic substrates, etc.

Before the fluorination reaction is started, the atmosphere in the reactor can be replaced with an inert atmosphere through 2-3 times of atmosphere replacement process of vacuuming-filling inert gas. The above reactor is a high temperature resistant and fluorine resistant reactor. Under the protection of inert gas, the first fluorinating agent, i.e. fluorine gas, is continuously introduced to carry out a fluorination reaction, the reaction temperature can be controlled at 150-550° C., and the reaction time is 2-20 h.

The above graphene powder or film may be a graphene material prepared by various methods, such as graphene powder or a film material obtained by a method such as a redox method, a gas phase deposition method, a mechanical stripping method, a liquid phase stripping method, or other methods.

The principle of preliminary fluorination is to make the carbon-carbon double bond on the surface of graphene form a surface structure of $C_2F_2$ by fluorine addition, and perform fluorination on the carbon-hydrogen bond at the boundary to form the boundary structure of $CF_2$, thereby completing the preliminary fluorination reaction of graphene.

In the step S2), the second fluorinating agent is continuously introduced under the protection of the inert gas, and the second fluorinating agent reacts with the graphene to carry out a deep fluorination reaction, the reaction temperature is controlled at 150-400° C. and the reaction time is 2-10 h. Deep fluorination is different from the preliminary fluorination. The principle of deep fluorination is to replace heteroatoms such as oxygen, nitrogen and others remaining on graphene with fluorine, that is, to replace a heterofunctional group such as a hydroxyl group, a carbonyl group or an amino group on a graphene with a fluorine atom. When the graphene is of high quality and contains heteroatoms of very low content, performing deep fluorination can effectively convert the graphene into a fluorinated graphene completely, and make the fluorine content of fluorinated graphene reach the theoretical level.

In addition, the inventor has found that using a gas fluorinating agent as the second fluorinating agent is the best, because unlike the conventional small molecule fluorine chemical reaction (small molecule substrate exists in the form of gas or a solution), the deep fluorination process of graphene powder is easy to cause agglomeration of graphene itself if it is carried out in a solvent, and it is difficult for the film material to perform a deep fluorination using a solution. Therefore, it is best to use a gas phase chemical reaction and a gas fluorinating agent to complete the fluorination reaction.

By the method of the present invention, the fluorine content of the fluorinated graphene can be effectively increased to a theoretical level. Meanwhile, since the reaction is carried out in the gas phase, and no solvent is involved, it will not cause the stacking of the fluorinated graphene powder sheets, and the relevant reaction can also be performed on the film. Thereby, a fluorinated graphene material having a high fluorine content, a very low heteroatom content, a complete sheet structure and a low surface energy is obtained.

Both the preliminary fluorination process and the deep fluorination process are carried out under the protection of inert gas, and the inert gas may be nitrogen gas, helium gas or argon gas. It is generally required that the content of hydrogen fluoride contained in the inert gas is as low as possible, which is also to avoid the formed fluorinated graphene doping with some extra hydrogen atoms.

In addition, during the synthesis of fluorinated graphene, the important conditions are mainly the type of fluorinating agent and the reaction temperature, but the correlation with the stoichiometric ratio is not significant, because the fluorinating agent tends to be greatly excessive in the fluorination process. After the fluorination reaction is completed, the gas discharged from the reactor is discharged after removing unreacted fluorine gas therein through air-washing.

Specifically, the first fluorinating agent in the step S1) may include mixed gas of fluorine gas and inert gas, and the volume ratio of fluorine gas to the mixed gas is (1-30):100. During the reaction, the mixed gas of fluorine gas and inert gas is uniformly passed through the material layer of the graphene powder or the surface of the film, the flow rate of the gas is preferably controlled to be 0.1-20 L/min, and the system pressure is controlled at 0.1 MPa-0.2 MPa. Although high pressure is more conducive to fluorination, the tolerance of the equipment will be affected, so the pressure is preferably not more than 0.2 MPa.

The inventor has also found that fluorine gas in the first fluorinating agent has extremely strong reaction activity as a strong oxidizing gas. The fluorine gas reacts with the graphene, when the fluorine gas is not diluted by the inert gas, that is, the concentration of fluorine gas is greater than 30%, the graphene may be directly cracked into $CF_4$, so pure fluorine gas cannot be used. When the fluorine gas is excessively diluted by the inert gas, that is, the concentration of fluorine gas is less than 1%, the fluorine gas may be unable to fluorinate the graphene, or the fluorination may be insufficient. Therefore, in the present invention, mixed gas of fluorine gas and inert gas is used as the first fluorinating agent for the preliminary fluorination process, and a volume ratio of fluorine gas to inert gas is (1-30):100.

Specifically, in step S2), under the protection of inert gas, gas phase fluoride is introduced into the surface of the fluorinated graphene crude product to carry out a fluorination reaction. For the same reason as that in the step S1), the flow rate of the gas is preferably controlled to be 0.1-20 L/min, and the pressure is controlled at 0.1 MPa-0.2 MPa. Mixed gas of gas phase fluoride and inert gas is introduced into the surface of the fluorinated graphene crude product to carry out a fluorination reaction, and the volume ratio of the gas phase fluoride to the inert gas is (20-80):100. The higher the concentration of the gas phase fluoride used, the faster the reaction, and the lower the concentration, the slower the reaction.

Gas phase fluoride should select the fluoride having fluorination activity, specifically can be selected from the group consisting of phosphorus trifluoride, bromine trifluoride, iodine trifluoride, sulfur tetrafluoride, anhydrous hydrogen fluoride, boron trifluoride, nitrogen trifluoride, sulfuryl fluoride-trimethylamine, sulfuryl fluoride-dimethylamine, sulfuryl fluoride-monomethylamine, sulfuryl fluoride-ammonia, sulfuryl fluoride, thionyl fluoride-trimethylamine, thionyl fluoride-dimethylamine, thionyl fluoride-monomethylamine, thionyl fluoride-ammonia, thionyl fluoride, and antimony pentafluoride. Sulfuryl fluoride-dimethylamine, sulfuryl fluoride-monomethylamine and the like described in the present application, similar to A-B represents a mixed system of A-B, namely, sulfuryl fluoride-dimethylamine, sulfuryl fluoride-monomethylamine, sulfuryl fluoride-ammonia, thionyl fluoride-trimethylamine, thionyl fluoride-dimethylamine, thionyl fluoride-monomethylamine, thionyl fluoride-ammonia respectively represent: a mixed system of sulfuryl fluoride and dimethylamine, a mixed system of sulfuryl fluoride and monomethylamine, a mixed system of sulfuryl fluoride and ammonia, a mixed system of thionyl fluoride and trimethylamine, a mixed system of thionyl fluoride and dimethylamine, a mixed system of thionyl fluoride and monomethylamine, a mixed system of thionyl fluoride and ammonia.

The principle of deep fluorination is briefly explained herein.

Sulfur tetrafluoride can selectively convert a hydroxyl group or a carbonyl group into a fluorine-substituted group or a difluoro-substituted group;

Anhydrous hydrogen fluoride-phosphorus trichloride, the phosphorus trichloride converts a hydroxyl group or a carbonyl group on the graphene into a phosphite ester or a halogenated phosphite ester, and then undergoes an Arbuzov reaction to be converted into a fluorine-substituted group or a difluoro-substituted group under the effect of anhydrous hydrogen fluoride;

Sulfuryl fluoride-ammonia, sulfuryl fluoride converts a hydroxyl group or a carbonyl group into a fluorine-substituted group or a difluoro-substituted group under the catalysis of ammonia.

All of the gas phase fluoride reagents involved above required to have stoichiometric ratios more than one basic stoichiometric ratio. For example, assuming that graphene has the largest oxygen content, the structure of $C_2(OH)_2$ will be formed. So each mole of graphene should be matched with at least 2 mol of a fluorinating reagent such as $SF_4$. Converted to an approximate mass ratio, it is about 1 g of graphene over 3 g of fluorinating reagent. That is, during the process of introducing a deep fluorinating reagent, at least 3 g of the fluorinating reagent is introduced.

In addition, since the graphene powder has a relatively high specific surface area, it is easy to adsorb vapor, oxygen or other gases, and the surface of the film is also prone to adsorption. If these adsorbed impurities are not removed, it will cause the fluorine gas to react with these impurities in the process of introducing fluorine gas later, and form highly active impurity substances. For example, water will react with fluorine gas to form substances such as hydrogen fluoride and oxygen fluoride, and further react with graphene to introduce hydrogen atoms or oxygen atoms that are not desired to be introduced. Therefore, at this stage, removing the impurities sufficiently can avoid the following negative impacts.

Therefore, further, the graphene raw materials undergo a pretreatment before performing the preliminary fluorination reaction of the graphene. The graphene materials are heated at the temperature of 200-300° C. for 2-4 h under an inert gas atmosphere.

Specifically, the graphene powder or film is placed in a reactor, and the atmosphere of the high temperature reactor is sufficiently replaced through 2-3 times of vacuuming-filling inert atmosphere process. Then, the graphene powder or the film is heated to 200-300° C. under the condition of introducing inert atmosphere continuously. After heating for 2-4 h, the moisture, gas and impurities adsorbed on the surface of the graphene powder or the film are sufficiently removed, thereby further improving the fluorination rate of the graphene.

Further, after being subjected to the above pretreatment, preliminary fluorination reaction and deep fluorination reaction, posttreatment steps including water-washing, alcohol-washing and drying are performed on the fluorinated graphene sequentially.

Specifically, the posttreatment is performed on the fluorinated graphene powder or film which has completed the deep fluorination. The fluorinating agent and salt remaining in the fluorination process are removed by water-washing, the fluorine-containing small molecular alkane and other impurities which may be formed in the fluorination process are removed by alcohol-washing, and then drying is performed to obtain the target fluorinated graphene powder or film products. After the above treatment, the cleanliness of the fluorinated graphene products is improved.

Preferably, during the preliminary fluorination reaction, the first fluorinating agent further includes fluorination catalyst gas, and the fluorination catalyst gas is one or more selected from the group consisting of phosphorus trifluoride, bromine trifluoride, iodine trifluoride, sulfur tetrafluoride, anhydrous hydrogen fluoride, phosphorus trichloride, boron trifluoride, nitrogen trifluoride, sulfuryl fluoride-trimethyl-amine, sulfuryl fluoride-dimethylamine, sulfuryl fluoride-monomethylamine, sulfuryl fluoride-ammonia, sulfuryl fluoride, thionyl fluoride-trimethylamine, thionyl fluoride-dimethylamine, thionyl fluoride-monomethylamine, thionyl fluoride-ammonia, thionyl fluoride, and antimony pentafluoride; and a volume ratio of the fluorination catalyst gas to the first fluorination agent gas is (20-80):100.

The addition of the fluorination catalyst gas improves the selectivity of the reaction between the fluorine gas and the graphene, and can significantly reduce the reaction temperature during the fluorination process, lowering the reaction temperature by 50-150° C. The higher the concentration of the fluorination catalyst gas used, the faster the reaction, the lower the concentration, the slower the reaction.

Therefore, preferably, the reaction temperature of the preliminary fluorination reaction in the above step S1) is controlled to be 150-400° C., which increases the safety and reliability of the fluorination reaction.

By the method of the present invention, the fluorine content of the fluorinated graphene can be effectively increased to a theoretical level. Meanwhile, since the reaction is carried out in the gas phase, and no solvent is involved, it will not cause the stacking of the fluorinated graphene powder sheets, and the relevant reaction can also be performed on the film. Thereby, a fluorinated graphene product having a high fluorine content, a very low heteroatom content, a complete sheet structure and a low surface energy is obtained.

Based on the above technical solutions, the beneficial effects obtained by the present invention are as follows:

1. the preliminary fluorination is carried out using the manner of passing the fluorine gas through the material layer, which makes the graphene powder being fully contacted with the fluorine gas and greatly improves the utilization rate of the fluorine gas;

2. the fluorinating reagent selected in the deep fluorination process effectively fluorinates the heteroatoms, defects and unfluorinated sites on the graphene, thereby further increasing the fluorine content of the graphene and reducing the heteroatom content.

Further, the graphene powder or film is pretreated to avoid the influence of moisture, oxygen and other impurities contained in the graphene powder or film on the reaction.

The present invention is further illustrated below with reference to the embodiments:

Embodiment 1

1 g of the graphene powder obtained by the redox method was weighed and placed in a reactor. After the reactor was subjected to a replacement of a nitrogen atmosphere, the temperature was raised to 150° C. Fluorine-nitrogen mixed gas having a volume ratio of fluorine to the mixed gas of 1:100 was started to introduce. The system pressure was controlled to be 0.1 MPa, and the flow rate of the gas was controlled at 0.1 L/min. After fluorination for 2 h, the introduction of the fluorine-nitrogen mixed gas was stopped, and nitrogen gas was introduced to maintain the temperature for 1 h and to complete the preliminary fluorination reaction. A fluorinated graphene powder crude product being preliminary fluorinated was obtained. Next, the temperature of the system was maintained at 150° C., and the sulfur tetrafluoride gas, diluted and protected by nitrogen gas, was introduced. The volume ratio of sulfur tetrafluoride gas to the mixed gas is 20:100. The system pressure was controlled at 0.1 MPa. The introduction of the sulfur tetrafluoride gas was stopped after 2 h, and the nitrogen gas was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

Embodiment 2

1 g of the graphene powder obtained by the redox method was weighed and placed in a reactor. After the reactor was subjected to a replacement of a nitrogen atmosphere, the temperature was raised to 550° C. Fluorine-nitrogen mixed gas having a volume ratio of fluorine to the mixed gas of 30:100 was started to introduce. The system pressure was controlled to be 0.2 MPa, and the flow rate of the gas was controlled at 20 L/min. After fluorination for 20 h, the introduction of the fluorine-nitrogen mixed gas was stopped, and the nitrogen gas was introduced to maintain the temperature for 1 h and to complete the preliminary fluorination reaction. A fluorinated graphene powder crude product being preliminary fluorinated was obtained. Next, the temperature of the system was reduced to 400° C., and the phosphorus trifluoride gas, diluted and protected by nitrogen gas, was introduced. The volume ratio of phosphorus trifluoride gas to the mixed gas is 80:100, and the system pressure was controlled at 0.2 MPa. The introduction of the phosphorus trifluoride gas was stopped after 10 h, and the nitrogen gas was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

Embodiment 3

3 g of the graphene powder obtained by the redox method was weighed and placed in a reactor. After the reactor was subjected to a replacement of a nitrogen atmosphere, the temperature was raised to 300° C. Fluorine-nitrogen mixed gas having a volume ratio of fluorine to the mixed gas of 15:100 was started to introduce. The system pressure was controlled to be 0.15 MPa, and the flow rate of the gas was controlled at 10 L/min. After fluorination for 10 h, the introduction of the fluorine-nitrogen mixed gas was stopped, and the nitrogen gas was introduced to maintain the temperature for 1 h and to complete the preliminary fluorination reaction. A fluorinated graphene powder crude product being preliminary fluorinated was obtained. Next, the temperature of the system was reduced to 250° C., and the iodine trifluoride gas, diluted and protected by nitrogen gas, was introduced. The volume ratio of iodine trifluoride gas to the mixed gas is 30:100, and the system pressure was controlled at 0.15 MPa. The introduction of the iodine trifluoride gas was stopped after 5 h, and the nitrogen gas was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

Embodiment 4

A graphene film grew on a copper substrate by chemical vapor deposition method and was transferred to a high temperature glass surface, and then placed in a reactor. After the reactor was subjected to a replacement of a nitrogen atmosphere, the temperature was raised to 200° C. The nitrogen gas was maintained to be introduced and vented for 2 h at the temperature to sufficiently remove the impurities such as moisture, then the temperature was raised to 350° C. Fluorine-nitrogen mixed gas having a volume ratio of fluorine to the mixed gas of 10:100 was started to introduce. The system pressure was controlled to be 0.2 MPa, and the flow rate of the gas was controlled at 10 L/min. After fluorination for 5 h, the introduction of the fluorine-nitrogen mixed gas was stopped, and the nitrogen gas was introduced to maintain the temperature for 1 h and to complete the preliminary fluorination reaction. A fluorinated graphene powder crude product being preliminary fluorinated was obtained. Next, the temperature of the system was reduced to 200° C., and the anhydrous hydrogen fluoride gas, diluted and protected by nitrogen gas, was introduced. The volume ratio of anhydrous hydrogen fluoride gas to the mixed gas is 40:100, and the system pressure was controlled at 0.15 MPa. The introduction of the anhydrous hydrogen fluoride gas was stopped after 3 h, and the nitrogen gas was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

Embodiment 5

A graphene film grew on a copper substrate by chemical vapor deposition method and was transferred to a high temperature glass surface, and then placed in a reactor. After the reactor was subjected to a replacement of a nitrogen atmosphere, the temperature was raised to 300° C. The nitrogen gas was maintained to be introduced and vented for 4 h at the temperature to sufficiently remove the impurities such as moisture, then the temperature was raised to 400° C. Fluorine-nitrogen mixed gas having a volume ratio of fluorine to the mixed gas of 10:100 was started to introduce. The system pressure was controlled to be 0.12 MPa, and the flow rate of the gas was controlled at 8 L/min. After fluorination for 5 h, the introduction of the fluorine-nitrogen mixed gas was stopped, and the nitrogen gas was introduced to maintain the temperature for 1 h and to complete the preliminary fluorination reaction. A fluorinated graphene powder crude product being preliminary fluorinated was obtained. Next, the temperature of the system was reduced to 250° C., and mixed gas having a volume ratio of sulfuryl fluoride-trimethylamine to antimony pentafluoride and to nitrogen gas of 10:10:80, diluted and protected by nitrogen gas, was introduced, and the system pressure was controlled at 0.12 MPa. The introduction of the mixed gas was stopped after 8 h, and the nitrogen gas was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

Embodiment 6

A graphene film grew on a copper substrate by chemical vapor deposition method and was transferred to a high temperature glass surface, and then placed in a reactor. After the reactor was subjected to a replacement of a nitrogen atmosphere, the temperature was raised to 250° C. The nitrogen gas was maintained to be introduced and vented for 3 h at the temperature to sufficiently remove the impurities such as moisture, then the temperature was raised to 450° C. Fluorine-nitrogen mixed gas having a volume ratio of fluorine to the mixed gas of 5:100 was started to introduce. The system pressure was controlled to be 0.14 MPa, and the flow rate of the gas was controlled at 6 L/min. After fluorination for 15 h, the introduction of the fluorine-nitrogen mixed gas was stopped, and the nitrogen gas was introduced to maintain the temperature for 1 h and to complete the preliminary fluorination reaction. A fluorinated graphene powder crude product being preliminary fluorinated was obtained. Next, the temperature of the system was reduced to 250° C., and mixed gas having a volume ratio of boron trifluoride to sulfuryl fluoride-monomethylamine and to nitrogen gas of 10:10:80, diluted and protected by nitrogen gas, was introduced, and the system pressure was controlled at 0.14 MPa. The introduction of the mixed gas was stopped after 6 h, and the nitrogen gas was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

Embodiment 7

3 g of the graphene powder obtained by the redox method was weighed and placed in a reactor. After the reactor was subjected to a replacement of a nitrogen atmosphere, the temperature was raised to 250° C. The nitrogen gas was maintained to be introduced and vented for 3 h at the temperature to sufficiently remove the impurities such as moisture, then the temperature was raised to 300° C. Fluorine-nitrogen mixed gas having a volume ratio of fluorine to the mixed gas of 25:100 was started to introduce. The system pressure was controlled to be 0.2 MPa, and the flow rate of the gas was controlled at 2 L/min. After fluorination for 15 h, the introduction of the fluorine-nitrogen mixed gas was stopped, and the nitrogen gas was introduced to maintain the temperature for 1 h and to complete the preliminary fluorination reaction. A fluorinated graphene powder crude product being preliminary fluorinated was obtained. Next, the temperature of the system was reduced to 150° C., and mixed gas having a volume ratio of nitrogen trifluoride to thionyl fluoride-ammonia to sulfuryl fluoride and to nitrogen gas of 10:10:10:70, diluted and protected by nitrogen gas, was introduced, and the system pressure was controlled at 0.14 MPa. The introduction of the mixed gas was stopped after 10 h, and the nitrogen gas was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

Embodiment 8

8 g of the graphene powder obtained by the redox method was weighed and placed in a reactor. After the reactor was subjected to a replacement of a helium atmosphere, the temperature was raised to 200° C. The helium gas was maintained to be introduced and vented for 3 h at the temperature to sufficiently remove the impurities such as moisture, then the temperature was kept at 200° C. Mixed gas having a volume ratio of fluorine gas to anhydrous hydrogen fluoride and to helium gas of 10:20:70 was started to introduce. The system pressure was controlled to be 0.2 MPa, and the flow rate of the gas was controlled at 1 L/min. After fluorination for 8 h, the introduction of the mixed gas was stopped, and the helium gas was introduced to maintain the temperature for 1 h and to complete the preliminary fluorination reaction. A fluorinated graphene powder crude product being preliminary fluorinated was obtained. Next, the temperature of the system was reduced to 150° C., and mixed gas having a volume ratio of bromine trifluoride to sulfuryl fluoride-trimethylamine to thionyl fluoride and to helium gas of 5:5:10:80, diluted and protected by helium gas, was introduced, and the system pressure was controlled at 0.2 MPa. The introduction of the mixed gas was stopped after 9 h, and the nitrogen gas was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

Embodiment 9

10 g of the graphene powder obtained by the redox method was weighed and placed in a reactor. After the reactor was subjected to a replacement of a helium atmosphere, the temperature was raised to 280° C. The helium gas was maintained to be introduced and vented for 2.5 h at the temperature to sufficiently remove the impurities such as moisture, then the temperature was reduced to 200° C., and mixed gas having a volume ratio of fluorine gas to thionyl fluoride and to helium gas of 10:80:10 was started to introduce. The system pressure was controlled to be 0.2 MPa, and the flow rate of the gas was controlled at 1 L/min. After fluorination for 7 h, the introduction of the mixed gas was stopped, and the helium gas was introduced to maintain the temperature for 1 h and to complete the preliminary fluorination reaction. A fluorinated graphene powder crude product being preliminary fluorinated was obtained. Next, the temperature of the system was reduced to 150° C., and mixed gas having a volume ratio of sulfuryl fluoride-trimethylamine to thionyl fluoride-dimethylamine to antimony pentafluoride and to helium gas of 5:5:10:80, diluted and protected by helium gas, was introduced, and the system pressure was controlled at 0.2 MPa. The introduction of the mixed gas was stopped after 8 h, and the nitrogen gas was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

Embodiment 10

5 g of the graphene powder obtained by the redox method was weighed and placed in a reactor. After the reactor was subjected to a replacement of a helium atmosphere, the temperature was raised to 220° C. The helium gas was maintained to be introduced and vented for 2.5 h at the temperature to sufficiently remove the impurities such as moisture, then the temperature was reduced to 220° C., and mixed gas having a volume ratio of fluorine gas to sulfuryl fluoride-dimethylamine and to helium gas of 10:40:50 was started to introduce. The system pressure was controlled to be 0.2 MPa, and the flow rate of the gas was controlled at 1 L/min. After fluorination for 12 h, the introduction of the mixed gas was stopped, and the helium gas was introduced to maintain the temperature for 1 h and to complete the preliminary fluorination reaction. A fluorinated graphene powder crude product being preliminary fluorinated was obtained. Next, the temperature of the system was reduced to 250° C., and mixed gas having a volume ratio of sulfuryl fluoride-trimethylamine to thionyl fluoride to phosphorus trifluoride and to helium gas of 10:10:20:60, diluted and protected by helium gas, was introduced, and the system pressure was controlled at 0.2 MPa. The introduction of the mixed gas was stopped after 4 h, and the nitrogen gas was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

Embodiment 11

1 g of the graphene powder obtained by the vapor deposition method was weighed and placed in a reactor. After the reactor was subjected to a replacement of a nitrogen atmosphere, the temperature was raised to 300° C. The nitrogen gas was maintained to be introduced and vented for 2 h at the temperature to sufficiently remove the impurities such as moisture, then the temperature was raised to 350° C., and fluorine-nitrogen mixed gas having a volume ratio of fluorine to the mixed gas of 10:100 was started to introduce. The system pressure was controlled to be 0.1 MPa, and the flow rate of the gas was controlled at 1 L/min. After fluorination for 8 h, the introduction of the fluorine-nitrogen mixed gas was stopped, and the nitrogen gas was introduced to maintain the temperature for 1 h. A fluorinated graphene powder crude product being preliminary fluorinated was obtained. Next, the temperature of the system was reduced to 200° C., and mixed gas having a volume ratio of sulfur tetrafluoride gas to nitrogen gas of 20:80, diluted and protected by nitrogen gas, was introduced, and the system pressure was controlled at 0.1 MPa. The introduction of the sulfur tetrafluoride gas was stopped after 4 h, and the nitrogen was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

Embodiment 12

A graphene film grew on a copper substrate by chemical vapor deposition method and was transferred to a high temperature glass surface, and then placed in a reactor. After the reactor was subjected to a replacement of a nitrogen atmosphere, the temperature was raised to 200° C. The nitrogen gas was maintained to be introduced and vented for 2 h at the temperature to sufficiently remove the impurities such as moisture, then the temperature was kept at 200° C. Fluorine-nitrogen mixed gas was started to introduce, and the volume ratio of fluorine gas to mixed gas is 2:100. The system pressure was controlled to be 0.1 MPa, and the flow rate of the gas was controlled at 0.5 L/min. After fluorination for 2 h, the introduction of the fluorine-nitrogen mixed gas was stopped, and the nitrogen gas was introduced to maintain the temperature for 1 h. A fluorinated graphene powder crude product being preliminary fluorinated was obtained. Next, the temperature of the system was reduced to 200° C., and mixed gas having a volume ratio of anhydrous hydrogen fluoride gas to nitrogen gas of 20:80, diluted and protected by nitrogen gas, was introduced, and the system pressure was controlled at 0.1 MPa. The introduction of the anhydrous hydrogen fluoride gas was stopped after 4 h, and the nitrogen gas was introduced to maintain the temperature for 1 h. Fluorinated graphene powder being fluorinated deeply was obtained, which was discharged after cooling to room temperature. After the conventional water-washing, alcohol-washing and drying, the target fluorinated graphene powder was obtained.

The fluorine content of the fluorinated graphene was analyzed by fluorine element analysis and XPS, and the size and thickness of the fluorinated graphene sheets were characterized by SEM.

The test results of the above embodiments are as follows:

| | Fluorine Content/% | Sheet Size/μm | Thickness/nm | Defect Structure |
| --- | --- | --- | --- | --- |
| Embodiment 1 | 60.1 | 10-15 | 2-3 | none |
| Embodiment 2 | 62.3 | 8-15 | 2-3 | none |
| Embodiment 3 | 63.8 | 8-15 | 2-3 | none |
| Embodiment 4 | 64.4 | 5-10 | 1-2 | none |
| Embodiment 5 | 67.5 | 3-8 | 1-2 | none |
| Embodiment 6 | 65.0 | 5-10 | 1-2 | none |
| Embodiment 7 | 66.9 | 3-10 | 1-2 | none |
| Embodiment 8 | 67.3 | 3-8 | 1-2 | none |
| Embodiment 9 | 68.0 | 2-8 | 1-2 | none |
| Embodiment 10 | 73.0 | 2-3 | 1-2 | none |
| Embodiment 11 | 68.1 | 5-15 | 1-2 | none |
| Embodiment 12 | 65.4 | 2-20 | 1-2 | none |

The above are only preferred embodiments of the present invention, and it should be noted that those skilled in the art can also make several improvements and retouchings without departing from the principles of the present invention. These improvements and retouchings shall also be deemed to be within the protective scope of the present invention.

What is claimed is:

1. A preparation method of fluorinated graphene, comprising:
    S1), under the protection of an inert gas, performing a first fluorination reaction between a graphene and a first fluorinating agent, wherein a reaction temperature is 150-550° C., a reaction time is 2-20 h, and a fluorinated graphene crude product is obtained; and wherein the graphene is graphene powder, or a graphene film; and the first fluorinating agent comprises a fluorine gas; and next
    S2), under the protection of an inert gas, performing a second fluorination reaction between the fluorinated graphene crude product and a second fluorinating agent, wherein the reaction temperature is 150-400° C., the reaction time is 2-10 h, and a fluorinated graphene is obtained; and wherein the second fluorinating agent is a gas-phase fluoride.

2. The preparation method according to claim 1, wherein the step S1) is specifically as follows:
    under the protection of the inert gas, mixed gas of the fluorine gas and the inert gas is introduced into a surface of the graphene continuously to perform the first fluorination reaction; and a volume ratio of the fluorine gas to the mixed gas is (1-30):100.

3. The preparation method according to claim 2, wherein the step S2) is specifically as follows:
    under the protection of the inert gas, mixed gas of the gas-phase fluoride and the inert gas is introduced to a surface of the fluorinated graphene crude product to perform the second fluorination reaction; and a volume ratio of the gas-phase fluoride to the mixed gas is (20-80):100.

4. The preparation method according to claim 3, wherein the gas-phase fluoride is one or more selected from the group consisting of phosphorus trifluoride, bromine trifluoride, iodine trifluoride, sulfur tetrafluoride, anhydrous hydrogen fluoride, boron trifluoride, nitrogen trifluoride, sulfuryl fluoride-trimethylamine, sulfuryl fluoride-dimethylamine, sulfuryl fluoride-monomethylamine, sulfuryl fluoride-ammonia, sulfuryl fluoride, thionyl fluoride-trimethylamine, thionyl fluoride-dimethylamine, thionyl fluoride-monomethylamine, thionyl fluoride-ammonia, thionyl fluoride, and antimony pentafluoride.

5. The preparation method according to claim 1, wherein before step S1), the preparation method further comprises:
    S0), heating the graphene at a temperature of 200-300° C. for 2-4 h under an inert gas atmosphere.

6. The preparation method according to claim 1, wherein after step S2), the preparation method further comprises: performing water-washing, alcohol-washing and drying on the fluorinated graphene sequentially.

7. The preparation method according to claim 1, wherein in the step S1), the first fluorinating agent further comprises fluorination catalyst gas;

the fluorination catalyst gas comprises one or more selected from the group consisting of phosphorus trifluoride, bromine trifluoride, iodine trifluoride, sulfur tetrafluoride, anhydrous hydrogen fluoride, boron trifluoride, nitrogen trifluoride, sulfuryl fluoride-trimethylamine, sulfuryl fluoride-dimethylamine, sulfuryl fluoride-monomethylamine, sulfuryl fluoride-ammonia, sulfuryl fluoride, thionyl fluoride-trimethylamine, thionyl fluoride-dimethylamine, thionyl fluoride-monomethylamine, thionyl fluoride-ammonia, thionyl fluoride, and antimony pentafluoride; and a volume ratio of the fluorination catalyst gas to first fluorination agent gas is (20-80):100.

8. The preparation method according to claim 7, wherein in the step S1), the reaction temperature is 150-400° C.

9. The preparation method according to claim 2, wherein in the step S1), the first fluorinating agent further comprises fluorination catalyst gas;

the fluorination catalyst gas comprises one or more selected from the group consisting of phosphorus trifluoride, bromine trifluoride, iodine trifluoride, sulfur tetrafluoride, anhydrous hydrogen fluoride, boron trifluoride, nitrogen trifluoride, sulfuryl fluoride-trimethylamine, sulfuryl fluoride-dimethylamine, sulfuryl fluoride-monomethylamine, sulfuryl fluoride-ammonia, sulfuryl fluoride, thionyl fluoride-trimethylamine, thionyl fluoride-dimethylamine, thionyl fluoride-monomethylamine, thionyl fluoride-ammonia, thionyl fluoride, and antimony pentafluoride; and a volume ratio of the fluorination catalyst gas to first fluorination agent gas is (20-80):100.

10. The preparation method according to claim 3, wherein in the step S1), the first fluorinating agent further comprises fluorination catalyst gas;

the fluorination catalyst gas comprises one or more selected from the group consisting of phosphorus trifluoride, bromine trifluoride, iodine trifluoride, sulfur tetrafluoride, anhydrous hydrogen fluoride, boron trifluoride, nitrogen trifluoride, sulfuryl fluoride-trimethylamine, sulfuryl fluoride-dimethylamine, sulfuryl fluoride-monomethylamine, sulfuryl fluoride-ammonia, sulfuryl fluoride, thionyl fluoride-trimethylamine, thionyl fluoride-dimethylamine, thionyl fluoride-monomethylamine, thionyl fluoride-ammonia, thionyl fluoride, and antimony pentafluoride; and a volume ratio of the fluorination catalyst gas to first fluorination agent gas is (20-80):100.

11. The preparation method according to claim 4, wherein in the step S1), the first fluorinating agent further comprises fluorination catalyst gas;

the fluorination catalyst gas comprises one or more selected from the group consisting of phosphorus trifluoride, bromine trifluoride, iodine trifluoride, sulfur tetrafluoride, anhydrous hydrogen fluoride, boron trifluoride, nitrogen trifluoride, sulfuryl fluoride-trimethylamine, sulfuryl fluoride-dimethylamine, sulfuryl fluoride-monomethylamine, sulfuryl fluoride-ammonia, sulfuryl fluoride, thionyl fluoride-trimethylamine, thionyl fluoride-dimethylamine, thionyl fluoride-monomethylamine, thionyl fluoride-ammonia, thionyl fluoride, and antimony pentafluoride; and a volume ratio of the fluorination catalyst gas to first fluorination agent gas is (20-80):100.

12. The preparation method according to claim 5, wherein in the step S1), the first fluorinating agent further comprises fluorination catalyst gas;

the fluorination catalyst gas comprises one or more selected from the group consisting of phosphorus trifluoride, bromine trifluoride, iodine trifluoride, sulfur tetrafluoride, anhydrous hydrogen fluoride, boron trifluoride, nitrogen trifluoride, sulfuryl fluoride-trimethylamine, sulfuryl fluoride-dimethylamine, sulfuryl fluoride-monomethylamine, sulfuryl fluoride-ammonia, sulfuryl fluoride, thionyl fluoride-trimethylamine, thionyl fluoride-dimethylamine, thionyl fluoride-monomethylamine, thionyl fluoride-ammonia, thionyl fluoride, and antimony pentafluoride; and a volume ratio of the fluorination catalyst gas to first fluorination agent gas is (20-80):100.

13. The preparation method according to claim 6, wherein in the step S1), the first fluorinating agent further comprises fluorination catalyst gas;

the fluorination catalyst gas comprises one or more selected from the group consisting of phosphorus trifluoride, bromine trifluoride, iodine trifluoride, sulfur tetrafluoride, anhydrous hydrogen fluoride, boron trifluoride, nitrogen trifluoride, sulfuryl fluoride-trimethylamine, sulfuryl fluoride-dimethylamine, sulfuryl fluoride-monomethylamine, sulfuryl fluoride-ammonia, sulfuryl fluoride, thionyl fluoride-trimethylamine, thionyl fluoride-dimethylamine, thionyl fluoride-monomethylamine, thionyl fluoride-ammonia, thionyl fluoride, and antimony pentafluoride; and a volume ratio of the fluorination catalyst gas to first fluorination agent gas is (20-80):100.

14. The preparation method according to claim 9, wherein in the step S1), the reaction temperature is 150-400° C.

15. The preparation method according to claim 10, wherein in the step S1), the reaction temperature is 150-400° C.

16. The preparation method according to claim 11, wherein in the step S1), the reaction temperature is 150-400° C.

17. The preparation method according to claim 12, wherein in the step S1), the reaction temperature is 150-400° C.

18. The preparation method according to claim 13, wherein in the step S1), the reaction temperature is 150-400° C.

* * * * *